US012576902B1

(12) United States Patent
Palmer et al.

(10) Patent No.: US 12,576,902 B1
(45) Date of Patent: Mar. 17, 2026

(54) CLAMPING ASSEMBLY FOR STEERING COLUMN

(71) Applicant: Steering Solutions IP Holding Corporation, Saginaw, MI (US)

(72) Inventors: Caleb Palmer, Freeland, MI (US); Travis Palmer, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 19/058,602

(22) Filed: Feb. 20, 2025

(51) Int. Cl.
　　B62D 1/184 (2006.01)
　　B62D 1/185 (2006.01)

(52) U.S. Cl.
　　CPC ............. B62D 1/184 (2013.01); B62D 1/185 (2013.01)

(58) Field of Classification Search
　　None
　　See application file for complete search history.

(56) References Cited

U.S. PATENT DOCUMENTS

| | | | | |
|---|---|---|---|---|
| 4,179,137 A | * | 12/1979 | Burke | B62D 1/184 |
| | | | | 280/775 |
| 12,233,935 B2 | * | 2/2025 | Bayer | F16D 3/065 |
| 2018/0354546 A1 | * | 12/2018 | Kreutz | B62D 1/195 |
| 2020/0339180 A1 | * | 10/2020 | Buys | B62D 1/195 |

FOREIGN PATENT DOCUMENTS

| | | | | |
|---|---|---|---|---|
| WO | WO-2018083412 A1 | * | 5/2018 | ............ B62D 1/184 |

OTHER PUBLICATIONS

WO2018083412A1 Machine English Translation (Year: 2018).*

* cited by examiner

*Primary Examiner* — Jason D Shanske
*Assistant Examiner* — Matthew James O'Neill
(74) *Attorney, Agent, or Firm* — Dickinson Wright PLLC

(57) ABSTRACT

A manually adjustable steering column assembly includes a clamping assembly moveable between an unlocked position and a locked position. The steering column assembly also includes a lower jacket. The steering column assembly further includes an upper jacket. The upper jacket comprises a first side and a second side, wherein the second side is segmented to include a first clamping segment, a second clamping segment, and a third segment disposed between, and joining, the first clamping segment and the second clamping segment, wherein the first clamping segment and the second clamping segment are not parallel or perpendicular to the third segment. The upper jacket also includes an upper side. The upper jacket further includes a lower side, wherein the upper side and the lower side have respective outer surfaces which are parallel to each other and perpendicular to the third segment of the second side.

9 Claims, 3 Drawing Sheets

CLAMPING ASSEMBLY FOR STEERING COLUMN

FIELD OF THE INVENTION

The following description relates to a clamping assembly for a vehicle steering column and, in particular, a jacket shape configuration for such clamping assemblies.

BACKGROUND

Steering columns in vehicles may be adjustable in a rake direction and a telescope direction. The adjustable steering column may be unlocked in order to be adjusted to a desired position. Once the desired position is reached, the steering column may be locked in place to resist movement from the desired position.

Clamp mechanisms and assemblies are used on many manually adjusted rake and telescope or rake steering columns. A cam assembly or another clamping mechanism is connected to a lever. The vehicle driver rotates the lever from an unlocked position to a locked position to secure the steering wheel location.

Manual telescoping steering columns may include multiple jackets, such as an upper jacket that fits inside a lower jacket. The jackets have sufficient overlap to extend the steering wheel to the driver's desired location. Once the wheel is in the desired location, a lever is rotated to the lock position to hold the steering wheel at the desired location. Typically, the upper jacket is round, although other shapes, such as an octagon, have been seen in the industry.

In order to clamp the upper jacket in place to the lower jacket, the lower jacket contains a split or flexible member that contacts the upper jacket and holds it in place with a friction force. There also may be another feature that has positive engagement to hold the column such as an energy absorbing feature that locks the upper to the lower, but this will have a set resolution and will not engage unless the upper jacket starts sliding. The clamp retention allows the driver to place the steering wheel at any location.

A drawback of this type of upper and lower jacket with a round cross section is that the interface between the upper and lower jackets is the sliding interface for telescoping the column, which benefits from a low coefficient of friction, is also the interface that clamps the two pieces together which would benefit from a high coefficient of friction. This results in a compromise between smooth sliding and high holding loads. Another drawback is that the round feature requires a feature to keep the upper from spinning in the lower when the adjustment must be made. This anti-rotation feature adds parts and cost to the system.

SUMMARY

According to one aspect of the disclosure, a manually adjustable steering column assembly includes a clamping assembly moveable between an unlocked position and a locked position. The steering column assembly also includes a lower jacket. The steering column assembly further includes an upper jacket partially disposed within the lower jacket and translatable relative to the lower jacket in a telescoping manner, wherein the locked position of the clamping assembly prevents movement of the upper jacket relative to the lower jacket, wherein the unlocked position permits movement of the upper jacket relative to the lower jacket. The upper jacket comprises a first side and a second side, wherein the second side is segmented to include a first clamping segment, a second clamping segment, and a third segment disposed between, and joining, the first clamping segment and the second clamping segment, wherein the first clamping segment and the second clamping segment are not parallel or perpendicular to the third segment. The upper jacket also includes an upper side. The upper jacket further includes a lower side, wherein the upper side and the lower side have respective outer surfaces which are parallel to each other and perpendicular to the third segment of the second side.

According to another aspect of the disclosure, a manually adjustable steering column assembly includes a clamping assembly moveable between an unlocked position and a locked position. The steering column assembly also includes a lower jacket. The steering column assembly further includes an upper jacket partially disposed within the lower jacket and translatable relative to the lower jacket in a telescoping manner, wherein the locked position of the clamping assembly prevents movement of the upper jacket relative to the lower jacket, wherein the unlocked position permits movement of the upper jacket relative to the lower jacket. The upper jacket includes a first side and a second side, wherein the first side and the second side each define at least one clamping interface surface. The upper jacket also includes an upper side. The upper jacket further includes a lower side, wherein the upper side and the lower side each define at least one sliding interface surface, wherein one or more of the at least one clamping interface surfaces have a coefficient of friction greater than one or more of the at least one sliding interface surfaces.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
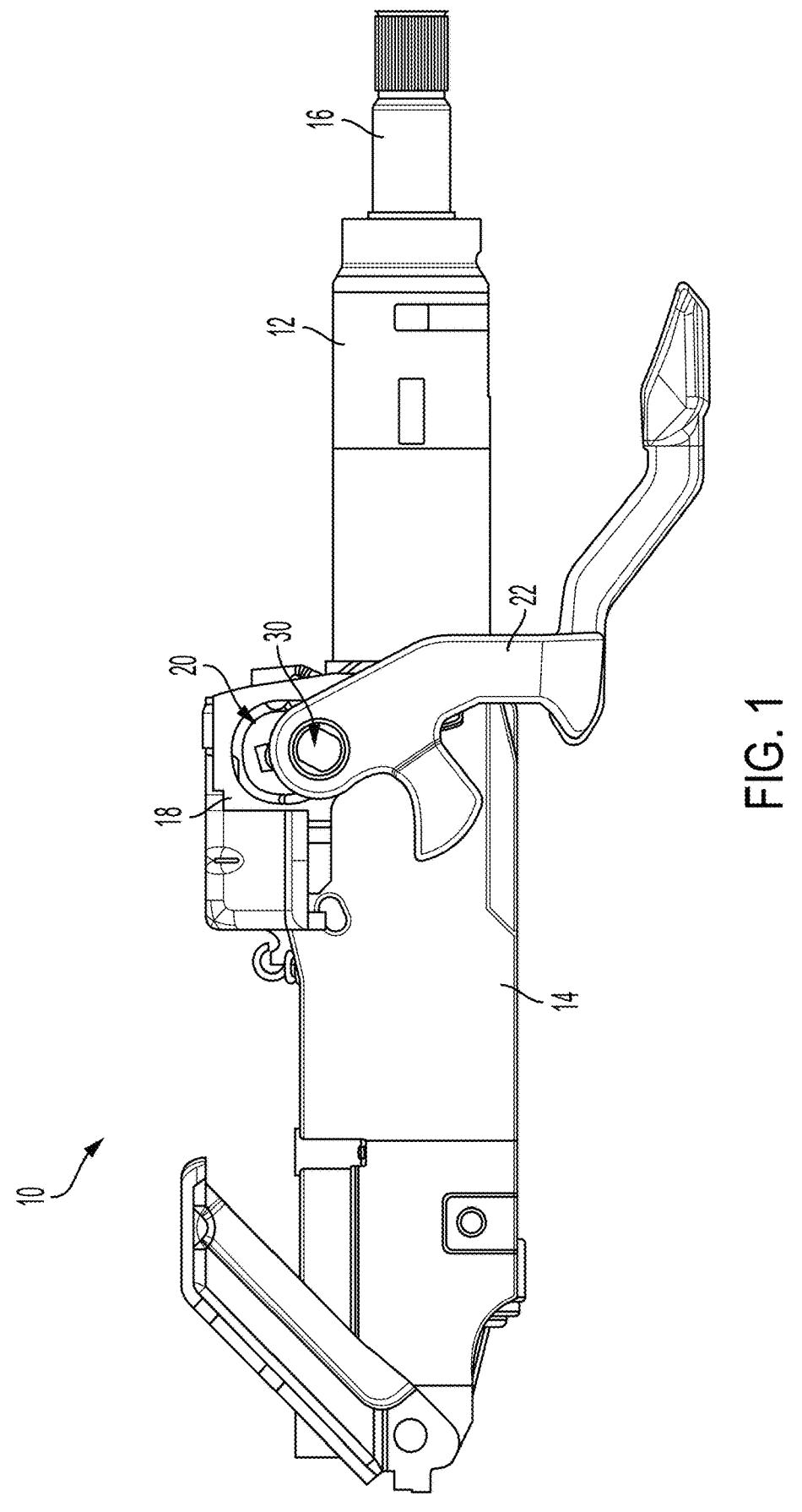
FIG. 1 is a side, elevation view of a steering column assembly having a clamping assembly to selectively lock and unlock a position of the steering column assembly.

Referring to FIG. 1, a steering column assembly for a vehicle is shown and generally referenced with numeral 10.

The steering column assembly 10 includes one or more jackets, such as an upper jacket 12 and a lower jacket 14. The upper jacket 12 houses a portion of a steering shaft 16 which is operatively coupled to a steering wheel (not shown). The lower jacket 14 is operatively coupled to a mounting bracket 18 that assists with mounting the steering column assembly 10 to a vehicle structure. It is to be appreciated that, as an alternative to the two-jacket assembly shown and described above, more than two jackets may be present in other embodiments.

The steering column assembly 10 may be used in any suitable vehicle, such as a car, a truck, a sport utility vehicle, a mini-van, a crossover, any other passenger vehicle, any suitable commercial vehicle, or any other suitable vehicle. Moreover, principles of the present disclosure may apply to other vehicles, such as aircrafts, boats, trains, drones, or other vehicles. The steering column assembly 10 may be configured as a driver interface steering system, an autonomous driving system, or a system that allows for both driver interface and autonomous steering.

The steering column assembly 10 includes a clamping assembly 20 to selectively place the steering column assembly 10 in a locked condition and an unlocked condition based on a locked position and an unlocked position of the clamping assembly 20. In particular, a rotatable lever 22 is configured to actuate the clamping assembly 20 between the locked position and the unlocked position, and vice versa. The rotatable lever 22 is an extension of the clamping assembly 20 into a cabin (not shown) of the vehicle, the lever 22 being accessible to a driver (not shown). The driver may engage the lever 22 in order to transition the steering column assembly 10 from the locked position to the unlocked position, or vice versa. In an unlocked position of the clamping assembly 20, the position of the steering column assembly 10 is adjustable and, when rotated into a locked position, the position of the steering column assembly 10 is fixed.

Figure 3:
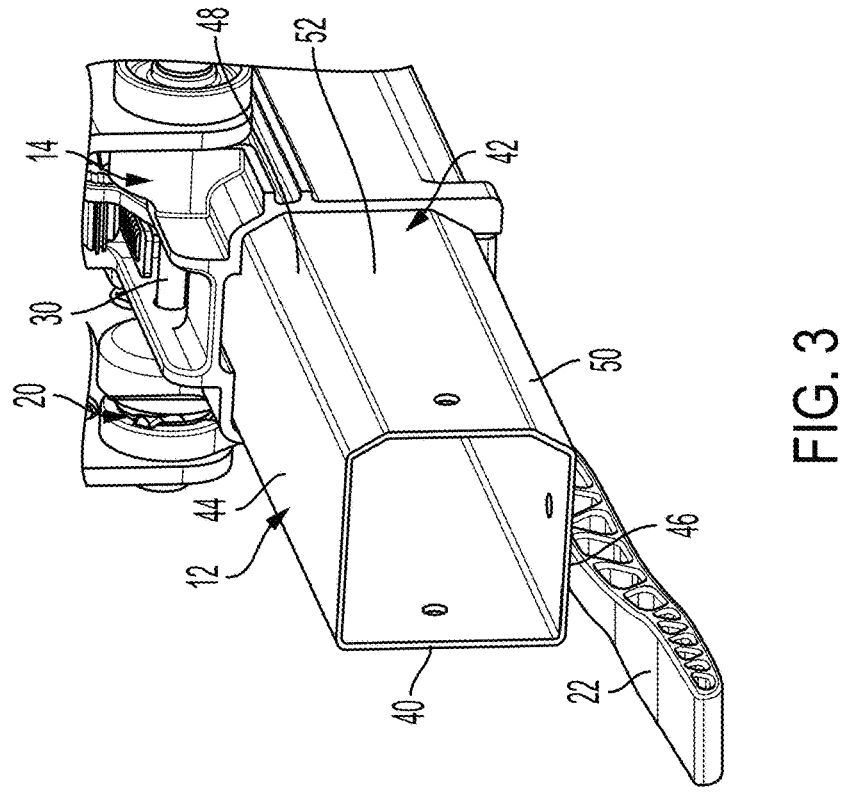
FIG. 3 is a second perspective view of a portion of the steering column assembly.
Figure 2:
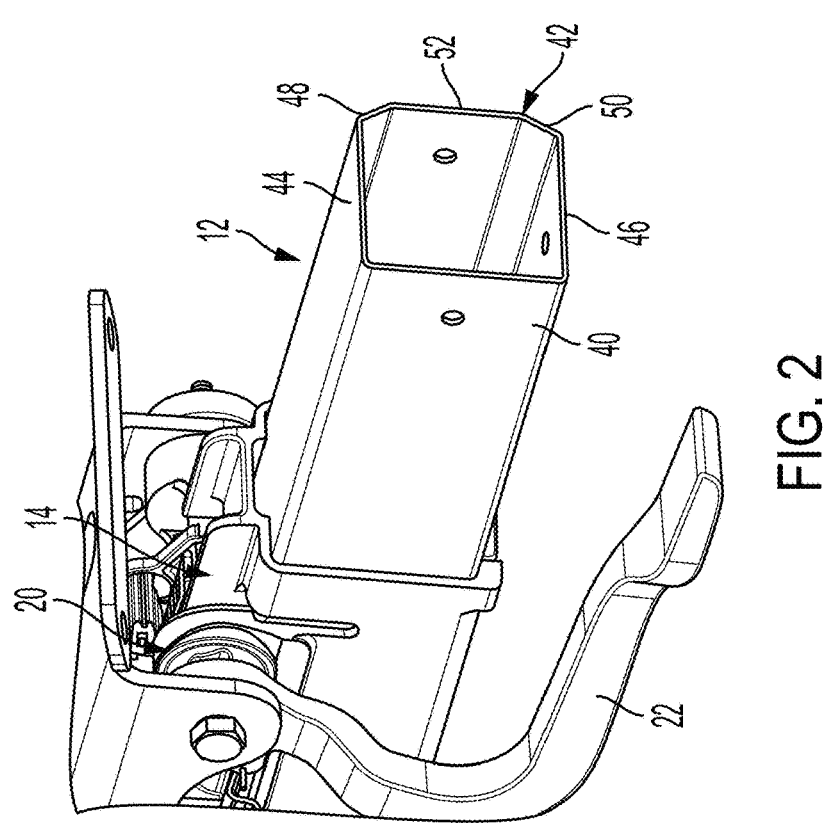
FIG. 2 is a perspective view of a portion of the steering column assembly.
Figure 4:
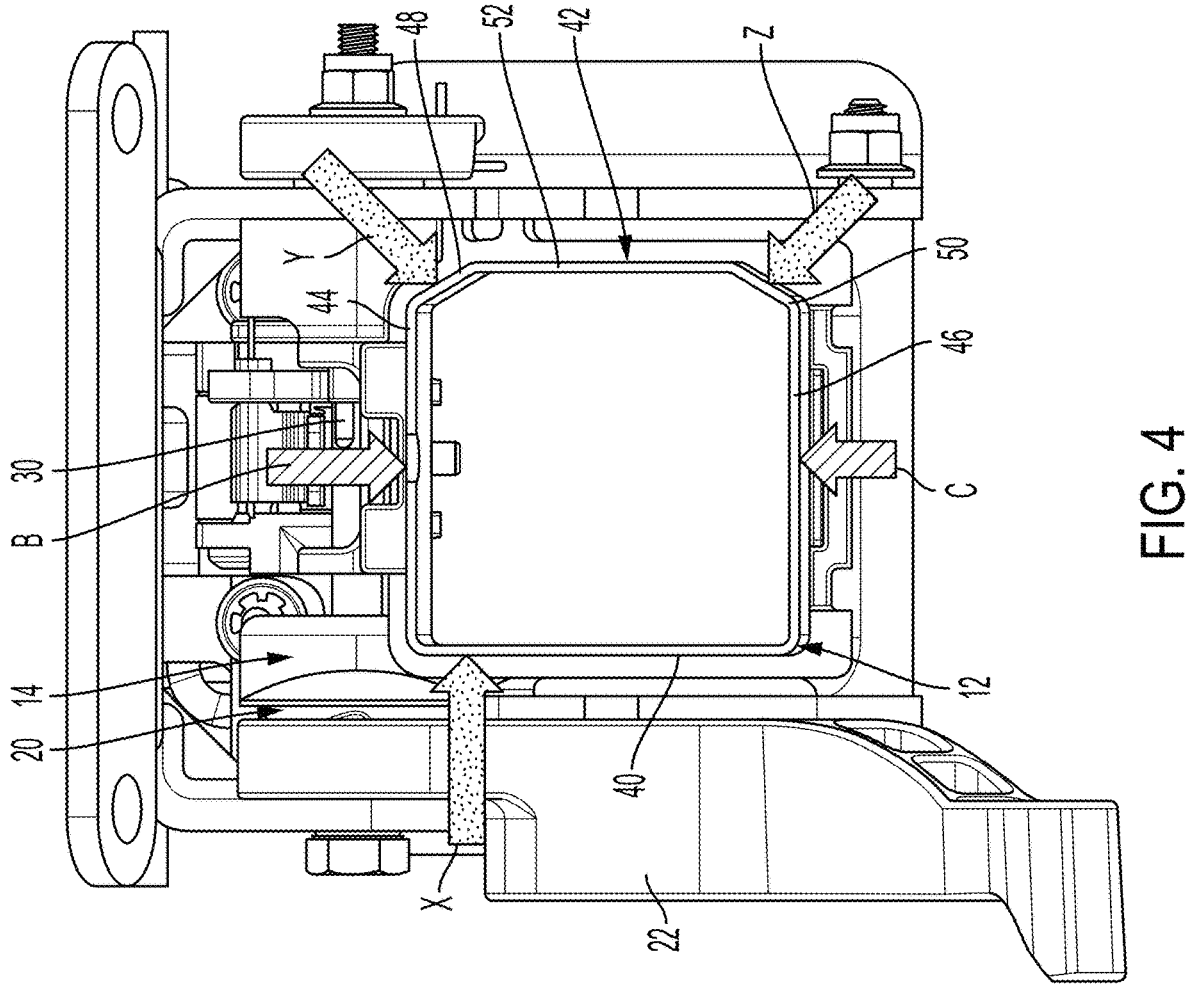
FIG. 4 is a sectional view of the steering column assembly.

As shown in FIGS. 2-4, the clamping assembly 20 includes a cam assembly that is actuated by rotation of the lever 22. By way of non-limiting example, a cam may be operatively engaged with a cam follower and a rake bolt 30. The rake bolt 30 extends through the lever 22, the cam follower and the cam. The cam follower is a component for converting rotation of the lever 22 to a linear force provided by the cam to clamp the steering column assembly 10. The rake bolt 30 extends through the clamping assembly 20 and through at least a portion of the steering column assembly 10 to hold both assemblies in place in relation to one another. The particular cam assembly described and illustrated is merely one example of the structure which may exert a clamping force on the jackets 12, 14 to selectively lock and unlock the position of the upper jacket 12 relative to the lower jacket 14.

The embodiments disclosed herein include a shape for an outer surface of the upper jacket 12 and a corresponding shape for the inner surface of the lower jacket 14 which decouple the telescope sliding force associated with adjustment of the upper jacket 12 and the clamping force associated with the locked position of the steering column assembly. It is desirable to have a high holding force for the upper jacket 12 when the clamping assembly is in the locked position, but when the clamping force and the sliding force are impacted by each other, a tradeoff is inherently required when designing steering columns. The embodiments disclosed herein separate those forces by not having the surfaces which interact with each other for clamping impact the sliding force associated with adjustment. Therefore, the embodiments disclosed herein differ from round jackets and other shaped jackets which are clamped in a manner that subjects the clamping force and the sliding force to be dependent on each other.

As shown, the upper jacket 12 includes a first side 40, a second side 42, an upper side 44 and a lower side 46. The first side 40, the upper side 44 and the lower side 46 each have an outer surface which is substantially planar. The outer surface of the upper side 44 and the lower side 46 are substantially parallel to each other. The outer surface of the first side 40 is substantially perpendicular to the outer surfaces of the upper side 44 and the lower side 46. It is to be appreciated that the corners which join the first side 40 with the upper side 44 and the lower side 46 may be slightly rounded. The second side 42 has an outer surface which is segmented into a first clamping segment 48, a second clamping segment 50, and a third segment 52 which is disposed between, and joins, the first and second clamping segments 48, 50. The third segment 52 of the second side 42 is oriented substantially parallel to the outer surface of the first side 40 and substantially perpendicular to the outer surfaces of the upper side 44 and the lower side 46. The first clamping segment 48 and the second clamping segment 50 are not oriented parallel or perpendicular to any of the outer surfaces of the other sides 40, 44, 46. In particular, the first clamping segment 48 and the second clamping segment 50 are each oriented at an angle between a respective end of the third segment 52 of the second side 42 to a respective end of the upper side 44 and the lower side 46.

The interaction between the top side 44 and the adjacent portion of the inner surface of the lower jacket 14, as well as the interaction between the lower side 46 and the adjacent portion of the inner surface of the lower jacket 14, defines the sliding force required to telescope the upper jacket 12 relative to the lower jacket 14. The interacting surfaces associated with the sliding force are generally referenced with arrows B and C in FIG. 4.

The interaction between the first side 40 and the adjacent portion of the inner surface of the lower jacket 14, as well as the interaction between the second side 42 and the adjacent portion of the inner surface of the lower jacket 14, defines the clamping force which holds the upper jacket 12 locked in position relative to the lower jacket 14. The interacting surfaces associated with the clamping force are generally referenced with arrows X, Y and Z in FIG. 4.

The above-described separation of the features associated with clamping and sliding allows the interface that handles the sliding for telescoping to be decoupled from the clamping features. This allows the coefficient of friction for the clamping interfaces and the sliding interfaces to be different from each other. The different coefficients of friction may be achieved in any suitable manner based on one or more characteristics of the interfaces. For example, the outer surfaces of the upper and bottom sides 44, 46 of the upper jacket 12 may be lubricated with a grease or other friction reducing material. Additionally, or as an alternative, the outer surfaces of the upper and bottom sides 44, 46 of the upper jacket 12 may have bearing surfaces, rollers or the like thereon (or in contact with such features on the inner surface of the lower jacket 14) to reduce the friction and assist with sliding. The clamping interfaces of the first and second sides 40, 42 of the upper jacket may be ungreased, have inserts with high friction coefficients, or surface texturing (e.g., roughness, knurl, etc.) that increases the holding force on the upper jacket from the clamping assembly 20. The clamping interface features are small, so the column the features disengage from the lower jacket 14 and the upper jacket 12 can slide freely in the lower jacket 14 when in the unlocked state. It is to be appreciated that the above-described examples are non-limiting of the feature(s) which may be used to differ the friction coefficients of the clamping interfaces and the sliding interfaces.

The substantially square cross-section of the upper jacket 12 (except for the clamping segments 48, 50 of the second side 42) also has a built-in anti-rotation feature, so additional anti-rotation components which are typically required are unnecessary in the embodiments disclosed herein since the chamfered corners act as a wedge. Thus, when the column is locked, the wedged arrangement removes lash in the interface so that even if the driver pushes up and down or left and right during adjustment, there will be no noticeable lash. In some embodiments, the first clamping segment 48 and the second clamping segment 50 are angled away from the third segment 52 at an equal absolute angle.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A manually adjustable steering column assembly comprising:
   a clamping assembly moveable between an unlocked position and a locked position;
   a lower jacket;
   an upper jacket partially disposed within the lower jacket and translatable relative to the lower jacket in a telescoping manner, wherein the locked position of the clamping assembly prevents movement of the upper jacket relative to the lower jacket, wherein the unlocked position permits movement of the upper jacket relative to the lower jacket, wherein the upper jacket comprises:
   a first side;
   a second side, wherein the second side is segmented to include a first clamping segment, a second clamping segment, and a third segment disposed between, and joining, the first clamping segment and the second clamping segment, wherein the first clamping segment and the second clamping segment are not parallel or perpendicular to the third segment;
   an upper side; and
   a lower side, wherein the upper side and the lower side have respective outer surfaces which are parallel to each other and perpendicular to the third segment of the second side,
   wherein the outer surfaces of the upper side and the lower side of the upper jacket define sliding interface surfaces, wherein the outer surfaces of the first side and the second side define clamping interface surfaces,
   wherein the sliding interface surfaces and the clamping interface surfaces have different coefficients of friction.

2. The manually adjustable steering column assembly of claim 1, wherein an outer surface of the third segment of the second side is parallel to an outer surface of the first side.

3. The manually adjustable steering column assembly of claim 1, wherein the first clamping segment and the second clamping segment are angled away from the third segment at an equal absolute angle.

4. The manually adjustable steering column assembly of claim 1, wherein the clamping assembly is moved between the locked position and the unlocked position with an adjustment lever.

5. The manually adjustable steering column assembly of claim 1, wherein at least one of the sliding interface surfaces includes a lubricant thereon.

6. The manually adjustable steering column assembly of claim 1, wherein at least one of the sliding interface surfaces includes a roller thereon.

7. The manually adjustable steering column assembly of claim 1, wherein at least one of the sliding interface surfaces is in contact with a roller operatively coupled to the lower jacket.

8. The manually adjustable steering column assembly of claim 1, wherein at least one of the clamping interface surfaces includes a surface roughness which is greater than the sliding interface surfaces.

9. The manually adjustable steering column assembly of claim 1, wherein an insert having a higher coefficient of friction than the sliding interface surfaces is disposed between at least one of the clamping interface surfaces and the lower jacket.

\* \* \* \* \*